March 21, 1933.   R. S. CROSBY ET AL   1,902,117
SCREW MAKING MACHINE
Filed Dec. 19, 1927   4 Sheets-Sheet 1
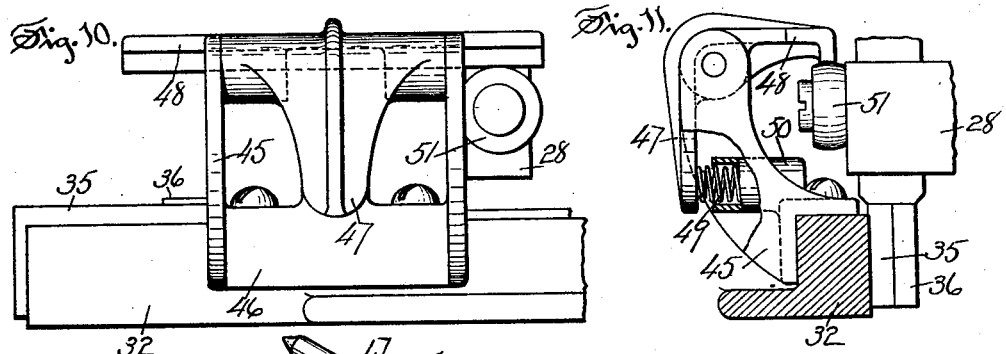
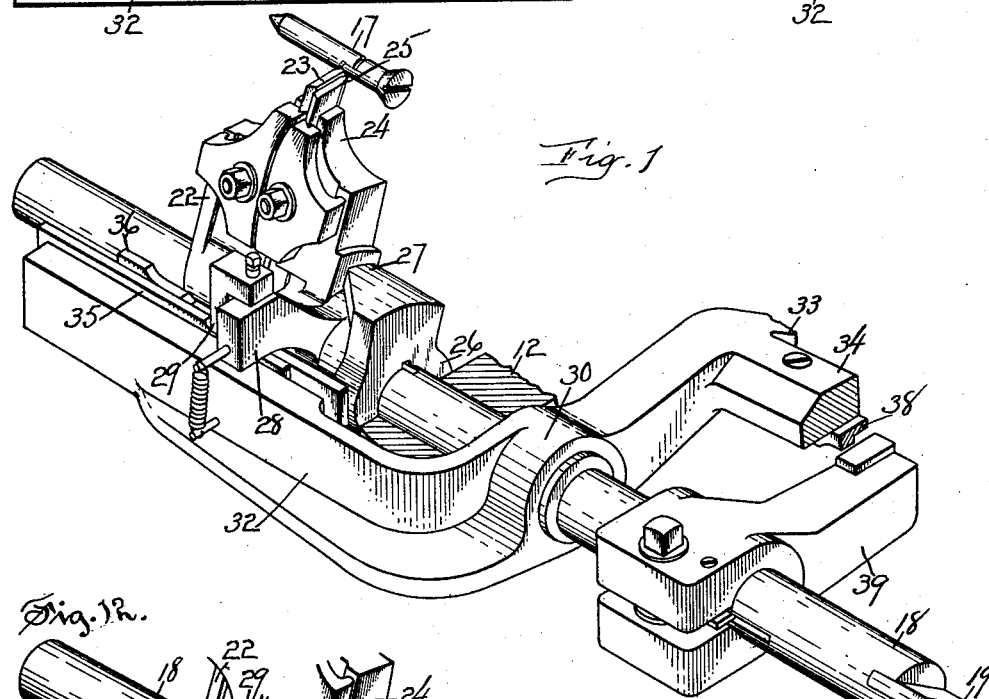
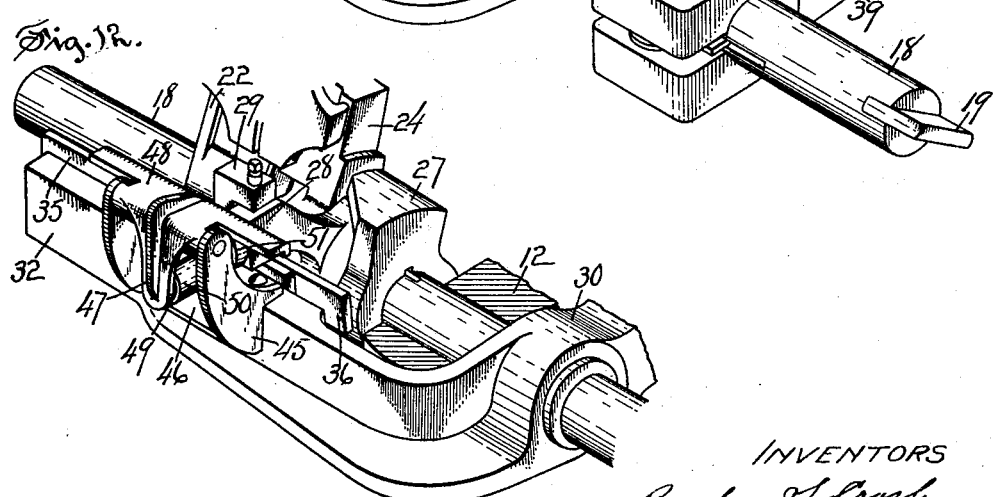
INVENTORS
Reuben S. Crosby &
Charles W. Spousel
by Arthur B. Jenkins
ATTORNEY

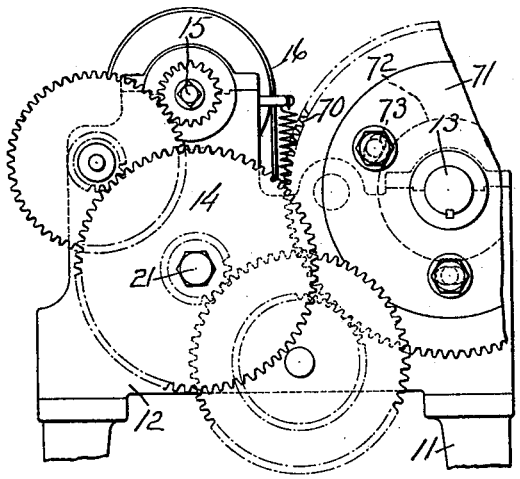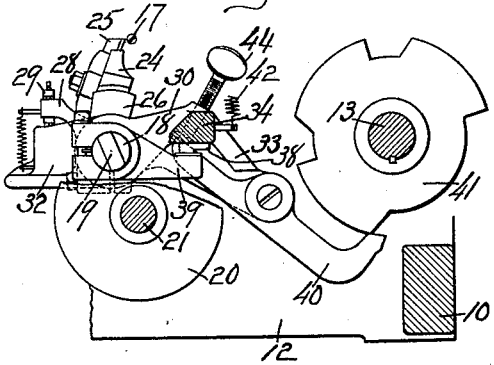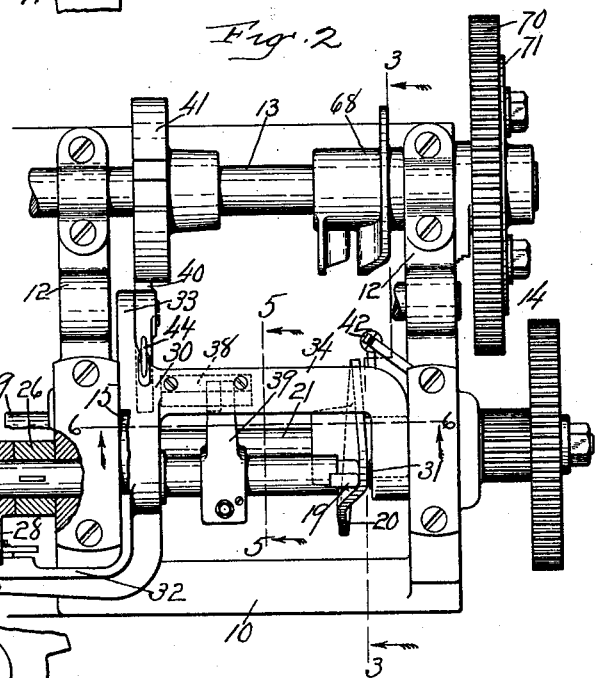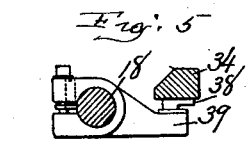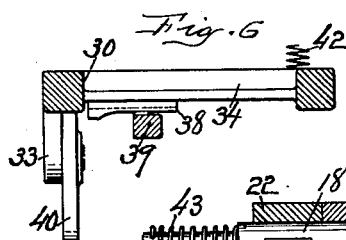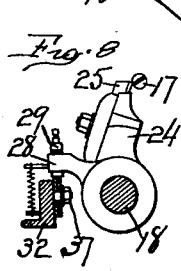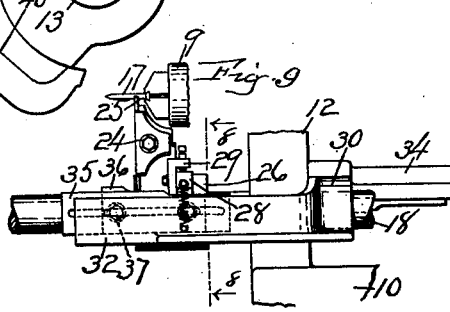

March 21, 1933. R. S. CROSBY ET AL 1,902,117
SCREW MAKING MACHINE
Filed Dec. 19, 1927 4 Sheets-Sheet 3
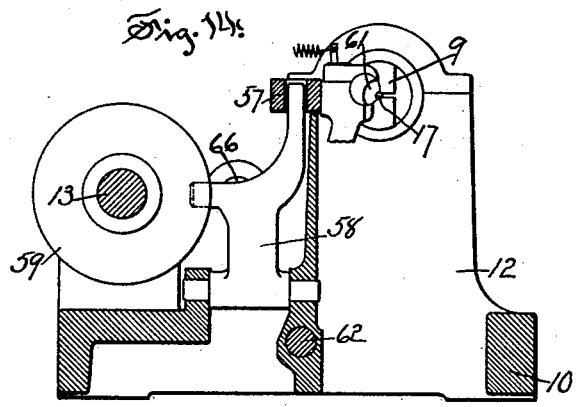
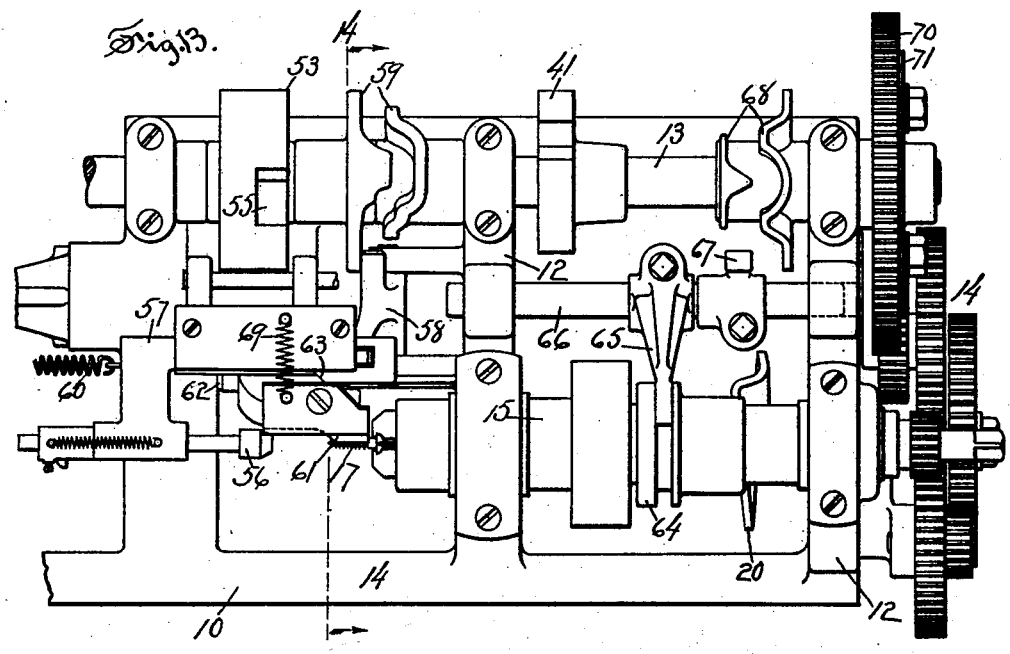

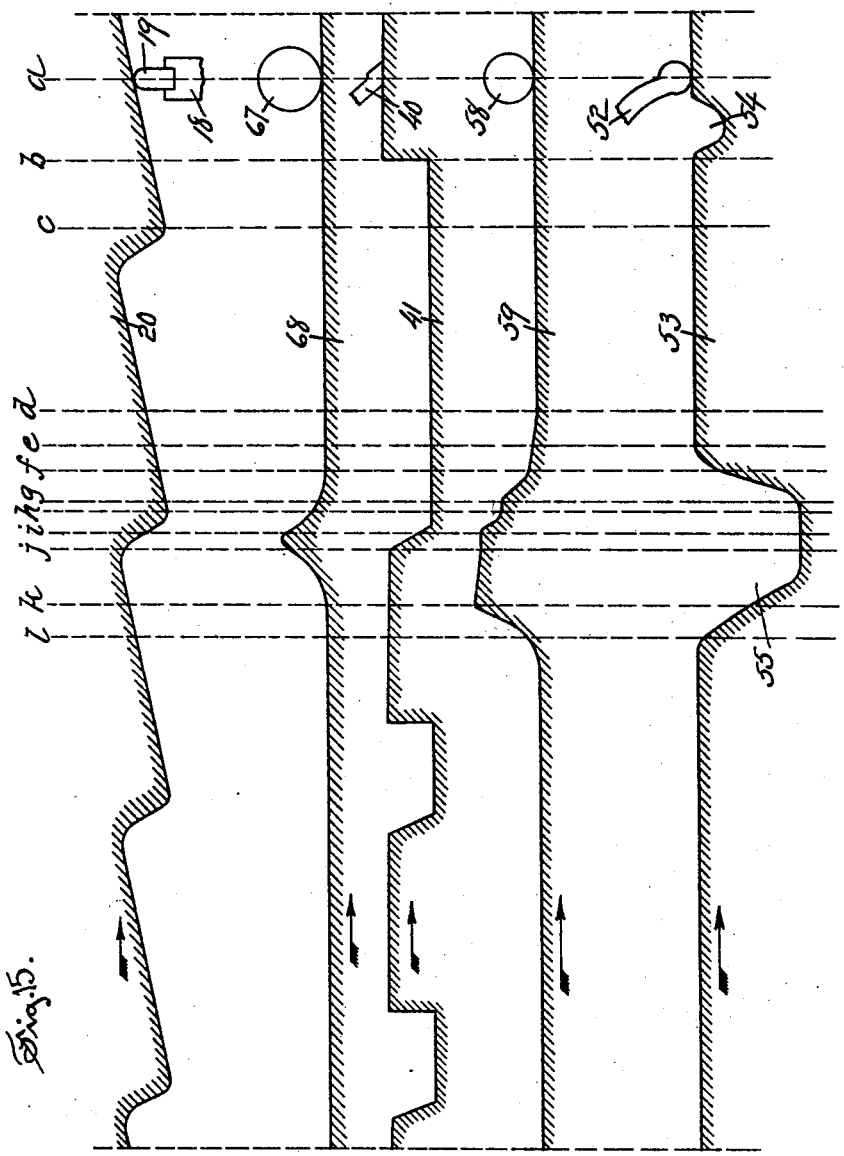

Patented Mar. 21, 1933

1,902,117

UNITED STATES PATENT OFFICE

REUBEN S. CROSBY, OF HARTFORD, AND CHARLES W. SPONSEL, OF WETHERSFIELD, CONNECTICUT, ASSIGNORS TO THE ASA S. COOK COMPANY, OF HARTFORD, CONNECTICUT, A CORPORATION OF CONNECTICUT

SCREW MAKING MACHINE

Application filed December 19, 1927. Serial No. 241,008.

Our invention relates to that class of machines that are employed for cutting threads on screw blanks, and an object of the invention, among others, is the provision of mechanism which will materially reduce the time required for cutting the threads, particularly on wood screws, so-called, and thereby greatly increase the output of such machines.

One form of machine embodying this invention and in the construction and use of which the objects herein set out, as well as others, may be attained, is illustrated in the accompanying drawings, in which—

Figure 1 is an isometric view of the tool supporting part of the tool operating mechanism of our improved machine.

Figure 2 is a top view of one end of our improved machine, with parts broken away to show construction and with the driving spindle and some of the gears omitted.

Figure 3 is a view in section on a plane denoted by the dotted line 3—3 of Figure 2.

Figure 4 is a view in elevation of a portion of one end of our improved machine.

Figure 5 is a view in section on a plane denoted by the dotted line 5—5 of Figure 2, parts beyond being omitted.

Figure 6 is a view in section on a plane denoted by the dotted line 6—6 of Figure 2, parts beyond being omitted.

Figure 7 is a detail view illustrating the construction of the rocker frame operating lever, with parts broken away to show construction.

Figure 8 is a view in section on a plane denoted by the dotted line 8—8 of Figure 9.

Figure 9 is a view in front elevation of a portion of the rocker frame and of one tool post.

Figure 1 is on a scale enlarged over that of Figures 2 to 9.

Figures 10, 11 and 12 are, respectively, front, side and isometric views of a modified structure for holding the tool fixtures shoe against its cam plates.

Figure 13 is a top view similar to Figure 2 but showing more of the mechanism.

Figure 14 is a view in section on a plane denoted by the dotted line 14—14 of Figure 13.

Figure 15 is a diagrammatic view illustrating the construction and operation of the cams and parts actuated thereby.

In the accompanying drawings the numeral 10 indicates the frame of our improved machine that may be supported in any suitable manner, as by legs 11, said frame including intermediate and end supports extending crosswise of the frame and in which various parts of the mechanism are mounted. A cam shaft 13 is mounted in the supports 12 and is connected as by means of a train of gears 14 with a driving spindle 15 also mounted in the supports 12 and driven as by means of a belt 16 that may extend from an electric motor or other suitable source of power, not herein shown. Said spindle is provided with a chuck 9 or other means for holding a screw blank 17, but as such holding means are common to machines of this class and therefore well understood by those skilled in the art a detailed description and illustration are omitted herein.

A tool supporting bar 18 is mounted for reciprocating movement in the supports 12, the support for one end of said bar, however, not being shown herein as it is not necessary to a clear understanding of the invention. This bar has a tip 19 set into its end for contact with a traversing member that is herein shown in the form of a cam 20 to impart reciprocating movement to the tool bar, said cam being secured to a shaft 21 mounted in two of the supports 12.

Our invention comprises means for effecting a double cut in a groove in a screw blank at each reciprocating movement of the tool supporting bar, and this we accomplish by the mechanism shown herein, and which may be embodied in several different forms to attain the desired end. In this arrangement we mount two tools on the bar 18 spaced apart so that they will operate side by side and simultaneously in the same groove but on opposite sides of the rib dividing adjacent sections of said groove, and the mechanism is so constructed that the tools will be brought into contact with the screw blank at proper times to accomplish the desired end.

In this arrangement a tool post 22 having a suitable clamp for securing a cutting tool 23 therein is secured to the bar 18 and another tool post 24 having a suitable clamp for securing a cutting tool 25 therein is loosely mounted on said bar to turn independently thereon. A spacing block 26 is secured to the bar 18 and has a tool post supporting lip 27 in contact with the side of the tool post 24 for the purpose of supporting said post in its movements to engage the tool 25 with a screw blank, and also while said tool is operating upon the blank. The tool post 24 has an arm 28 projecting therefrom and with a shoe 29 adjustably secured thereto for varying the depth of the cut, the lower end of the shoe riding upon the cam plates to be hereinafter described.

A rocker frame 30 is mounted for rocking movement upon the bar 18 and upon a stud 31 projecting from one of the supports 12 and as shown in Figure 2 of the drawings. This frame is of generally U-shape with one arm supported upon said bar and the other arm supported upon the stud. The frame also comprises a cam plate supporting arm 32 and an actuating lever supporting arm 33 with a cross bar 34 connecting the two branches of the frame, and as shown in Figure 2. The arm 32 has a thread cutting cam plate 35 and a pointing cam plate 36 secured to it, and as shown in Figure 1, the plate 35 being secured against the arm and the plate 36 being secured against the plate 35. These plates are secured as by bolts 37 passing through slots in the plates, and as shown in dotted lines in Figure 9, and by means of which the position of the plates on the arm may be adjusted.

A thread cutting cam plate 38 is secured to the under side of the cross bar 34, and as shown particularly in Figures 1, 5 and 6, and is adapted to be engaged by a shoe on a thread cutting arm 39 secured to and projecting from the bar 18. The cam plates 35 and 36 operate to throw the tool post 24 with its tool 25 into cutting engagement with the screw blank 17, said post rotating upon the bar 18 as hereinbefore described. The cam plate 38 is for the purpose of actuating the arm 39 and hence the bar 18 to rock the latter and move the tool post 22 so that the tool 23 thereon will engage the screw blank. These cams are formed to engage the tools with the screw blank at the proper time, the tool 25 being actuated by the pointing cam plate 36 to round the point on the blank after the tool 23 has passed beyond such point.

In operation to cut a thread the cutting tool 23 is first engaged with the screw blank by the action of the cam plate 38, as the bar 18 is moved endwise by the cam 20. When a groove has been cut entirely around the screw blank, as shown in Figure 1, by the tool 23 the shoe 29 on the arm 28 engages the cam on the bar 35 thus rocking the tool post 24 to engage its tool 25 within and at the beginning of the groove just cut by the tool 23, the tool 25 being rocked inwardly far enough to cut the groove deeper, and in this operation the tool post 24 rotating on the bar 18 as hereinbefore described. As the bar 18 continues its movement the tool 23 will pass beyond the pointed end of the blank 17 and immediately thereafter the shoe 29 will engage the cam on the plate 36, thus rocking the tool 25 rapidly inward to round and form the point on the blank.

When the operation just described is completed the cam 20 is shaped to permit the bar 18 to be returned rapidly to its starting point, as by means of a spring 43 that is so attached to the bar as to force it into engagement with the cam, and also as to exert a torsional force thereon to hold the thread cutting arm 39 in contact with the cam 38. Just before this return movement a rocker frame actuating lever 40 adjustably pivotally mounted on the arm 33 of the rocker frame is located opposite a depression in a tool disengaging cam 41 secured to the shaft 13 which permits the rocker frame to be actuated as by a spring 42 to move both tools away from the screw blank after the return movement of said tools carried by the bar 18 to their initial or starting point, when the operation will be repeated. In this operation it will be noted that the two tool posts and the supporting lip 27 are moved away from the screw blank together so that there is wear upon said lip only when the tool post 24 is moved toward the screw blank.

The actuating lever 40 is adjustably mounted on the arm 33, as by means of an adjusting screw 44 by means of which the position of the cam plates 35 and 36 may be changed with reference to the cam 41.

In Figures 10 to 12 (Sheet I of the drawings) there is shown a modification of the structure for holding the shoe 29 against the cam plates 35—36. In this structure a bracket including arms 45 and a base 46 is secured to the cam plate supporting arm 32 and a presser is pivotally mounted in said arms. This presser comprises a presser arm 47 and a presser plate 48 formed of a single piece. The arm 47 receives the pressure of a presser spring 49 located in a socket 50 forming an integral part of the bracket, hereinbefore referred to, said spring projecting out of said socket against the back of said arm, and as shown in Figure 11 of the drawings. This spring acts to hold a lip on the plate 48 in contact with a roller 51 mounted on a screw stud secured in the end of the arm 28, said roller rotating in contact with the under edge of said lip as the arm 28 is reciprocated in the operation of the bar 18.

The blanks 17 are supplied to the chuck 9 from a hopper (not shown) and by the operation of feed fingers, which are also omitted in the drawings, such hopper and feed fingers being common to machines of this class and for which reason a further and detailed description is not given as the construction and operation thereof will be readily understood by those skilled in the art. It is, however, shown that said feed fingers are operated by a rocking feed finger lever, which lever includes a rock shaft (not shown) and a tail 52 in contact with and operated by a feed finger operating cam 53 secured to the cam shaft 21. This cam has two depressions 54—55, the depression 54 operating the lever to cause the fingers to grasp the blanks and the depression 55 operating said fingers and lever to place the blanks in line with the opening between the jaws of the chuck 9. The cam just described and the depressions 54—55 therein permit the tail 52 of the feed finger operating lever, and the feed fingers connected therewith, to move forward under the influence of a spring arranged in any ordinary manner to hold the tail of the lever against the cam. This spring is not shown but its arrangement and operation will be readily understood by those skilled in the operation of machines of this kind.

When the blanks are positioned in front of the chuck as just described, they are pushed into the opening between the chuck jaws by a pointing tool 56 that engages the ends of the blanks and moves them forward. This pointing tool is yieldingly mounted on and supported by a pointing tool slide 57 operatively engaged with a pointing tool actuator 58 mounted for rocking movement in the frame, and as shown in Figure 13. This actuator is operated by a cam 59 secured to the cam shaft 21. The actuator 58 is held against the cam as by means of a spring 60 and the cam 59 is formed to positively move the slide 57 backward should for any reason the spring 60 fail to act.

A back rest 61 is pivotally mounted by means of a shaft 62 on the frame of the machine, this back rest being actuated by means of a cam 63 formed on the slide 57, and as shown in Figure 13.

When a blank has been placed between the chuck jaws the latter are operated to grasp the blank in a common and well known manner by a collar 64 engaged by an arm 65 on a chuck operating bar 66 mounted in the frame, and as shown in Figure 13. The bar 66 is actuated by engagement of a stud 67 thereon with a chuck operating cam 68 on the shaft 21.

When the blank has been grasped by the chuck the pointer is given a slight further advance movement to point the blank and is then moved back by the action of the spring 60 and cam 59, the back rest is moved by the cam 63 to support the blank and cams 41 and 20 function as hereinbefore described to actuate the threading tools to perform their operations after which the chuck jaws are actuated to release the blank for a repetition of the operation of the machine.

A very important feature of this invention resides in that arrangement whereby maximum speed, and therefore production, is obtained, the different elements being gradually moved to a location adjacent to the point of action, while other members are performing their operations, thus being in readiness to promptly take up their work as soon as the other parts finish and move out of the way and without loss of time in arriving at the point of action. This is graphically illustrated in Figure 15 wherein a development of the cams in a straight line is shown, the beginning of a cycle of operations of the machine being at the points on the cam denoted by the dotted line $a$. At this point the tail 52 of the feed finger operating lever is just ready to drop in to the depression 54, the pointer actuator 58 is in position with the pointer at its rearward limit of movement, and inactive, the operation upon the preceding blank being not yet finished and therefore the rocker arm actuating lever 40 being on the high part of the cam 41 to position the cutting tools for engagement with the blank being cut, and the chuck actuating stud 67 is in the position assumed when the chuck jaws are closed. The tip 19 of the bar 18 is advancing up the incline of the cam 20 to pass the cutting tools along the blank in the cutting operation.

Now, as the tail 52 drops into the depression 54 the feed fingers are advanced to pick up a blank for delivery to the chuck, and immediately passing out of said depression said fingers move slightly backward to permit a blank supplying member (not shown) and from which the blank was obtained from the feed fingers, to move out of the way. During this interval the action of all of the other parts is unchanged. At about the time the tail 52 leaves the depression 54 the rocker frame actuating lever suddenly drops into a depression in the cam 41 at the point indicated by the dotted line $b$ and the cutting tools are moved away from the blank, having completed their cutting operation, but the advance of said cutting tools along the blank continues until the cam reaches the point indicated by the dotted line $c$, this to accommodate blanks of greater length when such shall be desired. It is here observed that in the arrangement herein shown the cam 20 makes four complete rotations to a single rotation of each of the other cams, this single rotation of the other cams being defined by the length of cam surface shown in this figure 15. This increased speed of the cam 20 is obtained by the gear train hereinbefore referred to. Different speeds may be given to this cam 20 by a change in the gear ratios and to effect the cutting of screws of different sizes.

From the point indicated by the dotted line c the tip 19 of the bar 18 passes down an inclined portion on the cam to move the cutting tools to a point to begin another cutting operation, but at this point the cam 20 makes an ineffective rotation, the cutting tools being advanced along the blank but remaining out of contact with it. This occupies but a brief interval in the operation of the machine and is for the purpose of permitting the placing of a new blank in the chuck. During this movement of the cam 20, just described, the cam 59 reaches a point indicated by the dotted line d, at which point a slight incline upwardly on the cam begins. This starts a slow forward movement of the pointer. As the cams advance the cam 53 reaches a point denoted by the dotted line e at the edge of the depression 55 and in the continuing movement of the cams the tail 52 drops into said depression, thereby moving the feed finger lever and the feed fingers forward to position the blank in said fingers in line with the chuck 9. During this movement of the cam the cam 59 reaches a point denoted by the dotted line f whereat the cam surface on said cam inclines rapidly upwardly thereby moving the pointer 56 rapidly forward to a position close to the end of the blank in readiness for prompt action thereon. At the point indicated by the dotted line g the cam is formed to caused a dwell in the action of the tool and the pointer therefore remains stationary but in readiness for prompt action, this dwell being for the purpose of permitting the back rest 61 to move out of the way, such movement being effected by the action of the cam 63 caused by the pointer actuating lever as the end 58 thereof moves up the incline seen between the lines f and g. As the back rest moves back, as by the action of a spring 69, it clears the way for forward movement of the pointer which promptly takes place as the end of the lever 58 reaches the point indicated by the dotted line h. During this interval the tail 52 of the feed finger lever has dropped into the depression 55, as hereinbefore explained, and the feed fingers are moved back to their rearward position where they remain during a completion of the cycle of operation of the machine.

At about the point denoted by the dotted line g the chuck jaw actuating stud 67 passes along a steep inclination of the lobe on the cam 68 and the chuck jaws are rapidly opened to release the finished blank or screw cut during the preceding operation.

From the point indicated by the dotted line h the actuator 58 continues on up another steep inclination on the cam 59, thus causing the pointer to push the blank through the feed fingers and into the chuck 9 which has just been fully opened, this insertion of the blank in the chuck jaws, as a matter of fact, taking place while said jaws are being opened. When the actuator 58 reaches a point indicated by the dotted line i on the cam a dwell takes place in the movement of the pointer for a brief interval during which time the tip 19 on the bar 18 passes down an inclination on the cam 20 to effect movement of the cutting tools to the point for beginning a cutting operation, and the actuating lever 40 passes up an inclined surface on the cam 41 to move the cutting tools toward the work for a cutting action. During this time the chuck actuating stud 67 has passed over the lobe of the cam 68 thus closing the chuck jaws on the new blank, this operation having taken place during movement of the actuator 58 from the line i to a point indicated by the dotted line j, from which latter point the cam 59 inclines slightly upward, thus moving the actuator 58 to operate the pointer to point the blank. During this operation the actuating lever 40 has passed up the inclined portion of the cam 41, this completing its first action, and further movement of the cutting tools toward the work is effected by the action of the cam plates 35—36, as hereinbefore described.

Just after the tip 19 of the bar 18 passes the point indicated by the dotted line j an upward inclination on the cam 20 is reached and the bar 18 is operated to move the cutting tools forward in a cutting action. As the beginning of this cutting action takes place at the heel of the thread the forward movement of said cutting tools begins during the action of the pointer to point the blank and before the cutting tools reach the point of the blank, in fact, just after they start their forward movement at about the point indicated by the dotted line k. When the actuator 58 reaches a point indicated by the dotted line k it passes quickly down an inclined surface on the cam 59, thus moving the pointer to the backward limit of its play where such pointer remains until again advanced by the first upward inclination on the lobe of the cam 59, as hereinbefore described.

From this point on all of the parts remain in the positions heretofore explained, with the exception of the bar 18, which is reciprocated by the cam 20, and the actuating lever 40 which is operated to rapidly move the tools into position to be engaged with the blank by the cam plates 35 and 36, this completing one cycle of operation of the machine.

In the arrangement herein shown the cams on the cam shafts 13, and especially the cam 59, are so formed as to enable certain operations to be performed during a single rotation of the shaft 21 bearing the traversing cam 20. By this arrangement the capacity of the machine as to production is materially increased as the successive operations of different cam members, and parts operated thereby, follow one another immediately and without the necessity of waiting for the cam 20 to complete a rotation partially effected. In prior machines the operations of members by cams on the cam shaft 13 have been such that they could not be completed during a single operation of a cam 20, and consequently lost time takes place in holding back operations of members on the cam shaft 13 while waiting for completion of a rotation of the cam 20, a part of which only was necessitated owing to the other operations as hereinbefore stated.

One feature of this invention, not hereinbefore set out, resides in the arrangement of the driving gear 70 for the cam shaft 13 and which is secured to said shaft. It often is desirable to change the relative positions of the cams on the cam shaft 13 circumferentially or, in other words radially with respect to the circumferential or radial position of other parts of the machine. This may be readily accomplished when such change requires a radial movement equal to the width of a gear tooth, but a difficulty is encountered when the change is such as to require a movement of the cams to an extent of a fraction only of the width of a gear tooth. We have overcome this difficulty by so arranging the gear 70 that any amount of change radially, no matter how small, with respect to the shaft 13 may be obtained. To this end a gear plate 71 is keyed to the shaft 13 and the gear 70, in the form of a gear ring and having a flange 72, is secured to the plate by a bolt and slot connection, as herein shown bolts in the plate being entered into slots 73 in the flange 72 and as shown in Figure 4 of the drawings.

In accordance with the provisions of the patent statutes we have described the principles of operation of our invention, together with the device which we now consider to represent the best embodiment thereof; but we desire to have it understood that the device shown is only illustrative and that the invention may be carried out by other means and applied to uses other than those above set out.

We claim—

1. A screw making machine including means for holding and rotating a screw blank, a pluarlity of cutting tools positioned to effect simultaneous cutting action along the same groove in said blank, a tool post support, a cutting tool post fast to said support, a cutting tool post supported on but movable independently of said support, means for rocking said support to engage a tool on one of said posts with the blank, means for engaging the tool on the other post with said blank, means for securing the last named post to said support for movement of said post away from the blank by the rocking movement of the support, and means for imparting relative movement to said support and blank lengthwise of the latter.

2. Screw making machine including means for holding and rotating a screw blank, a plurality of cutting tools positioned to act in a simultaneous cutting operation along the blank, a tool post support, a cutting tool post fast to said support, a cutting tool post supported on but movable independently of said support, means for rocking said support to engage a tool on one of said posts with the blank, means for engaging the tool on the other post with said blank, means for connecting the last named post with said support for movement of said post away from the blank by the rocking movement of the support, and means for imparting relative movement to said support and the blank lengthwise of the latter.

3. A screw making machine including a tool supporting bar, a tool post secured to said bar, a tool post mounted for rocking movement on said bar, a frame mounted for rocking movement on said bar, a cam plate secured to said bar in the path of movement of a projection extending laterally from the post movably mounted on the bar, a cam plate supported on said frame in the path of movement of a projection from said bar, means to effect lengthwise movement of said tool bar, and means for actuating said frame to simultaneously move both of said posts away from said blank.

4. A screw making machine including means for holding and rotating a screw blank, a tool supporting bar, a tool post secured to said bar, a tool post movably mounted on said bar, a frame mounted for rocking movement on said bar, cam plates located on opposite sides of the axis of said frame, one of said plates being located in the path of movement of a projection from said bar and the other cam plate being located in the path of movement of a projection from the post movably mounted on the bar, means for holding both of said projections in contact with said cam plates, and means for causing endwise movement of said bar.

5. A screw making machine including a tool post fixture, means for rocking said fixture toward and from a blank being operated upon, a presser pivotally supported by said fixture and having a presser arm and a presser plate, and a spring pressing against said arm to press said plate against said rocking means.

6. A screw making machine including a tool post fixture, cam plates for rocking said fixture, a presser bracket supported by said fixture, a presser pivotally mounted in said bracket, means for swinging said presser on its pivot to engage it with said plates thereby to effect rocking movement of said fixture, and means for moving said fixture along said plates.

7. A screw making machine including a chuck for holding a blank, a cutting tool, means for traversing said tool along said blank, means for supporting a blank in said chuck, a pusher, means for advancing the pusher to a point adjacent to said blank supporting means while supporting a blank, means for halting the movement of the pusher, means for moving the supporting means and for placing a blank in front of said pusher during said halt, means for advancing the pusher to place the blank in said chuck, and means for retracting said pusher.

8. A screw making machine including a chuck for holding a blank, a cutting tool, means for traversing said tool along said blank, means for positioning a blank in front of said chuck, a back rest for a blank, a pusher, means for advancing the pusher to a point adjacent to the back rest while supporting a blank, means for halting the movement of said pusher, means for moving the back rest, means for advancing the pusher to place the blank in said chuck, and means for retracting said pusher.

REUBEN S. CROSBY.
CHARLES W. SPONSEL.